(12) United States Patent
Midy

(10) Patent No.: US 9,403,571 B2
(45) Date of Patent: Aug. 2, 2016

(54) MOTORCYCLE COMPRISING A SELF SUPPORTING SHELL

(71) Applicant: RDMO, Angers (FR)

(72) Inventor: Olivier Midy, Rochefort sur Loire (FR)

(73) Assignee: RDMO, Angers (FR)

(*) Notice: Subject to any disclaimer, the term of this patent is extended or adjusted under 35 U.S.C. 154(b) by 0 days.

(21) Appl. No.: 14/414,131

(22) PCT Filed: Jul. 10, 2013

(86) PCT No.: PCT/FR2013/051655
§ 371 (c)(1),
(2) Date: Apr. 22, 2015

(87) PCT Pub. No.: WO2014/009661
PCT Pub. Date: Jan. 16, 2014

(65) Prior Publication Data
US 2015/0314825 A1   Nov. 5, 2015

(30) Foreign Application Priority Data
Jul. 13, 2012   (FR) ..................... 12 56793

(51) Int. Cl.
*B62J 35/00*   (2006.01)
*B62J 1/00*   (2006.01)
*B62K 11/02*   (2006.01)

(52) U.S. Cl.
CPC .. *B62J 35/00* (2013.01); *B62J 1/00* (2013.01); *B62K 11/02* (2013.01)

(58) Field of Classification Search
CPC .......... B62J 35/00; B62K 11/02; B62K 11/08
USPC ....................................................... 180/225
See application file for complete search history.

(56) References Cited

U.S. PATENT DOCUMENTS

| 1,510,937 A * | 10/1924 | Harley ................. B62K 11/08 180/219 |
| 4,775,025 A * | 10/1988 | Parker ................. B62K 25/005 180/219 |
| 4,951,774 A * | 8/1990 | Buell ................. B62K 11/08 180/219 |
| 5,012,883 A * | 5/1991 | Hiramatsu ............ B62K 11/04 180/219 |
| 6,484,837 B1 | 11/2002 | Buell et al. |
| 7,497,455 B2 * | 3/2009 | Kamalian .............. B62K 11/04 280/274 |
| 7,690,467 B2 | 4/2010 | Sheahan et al. |
| 7,845,451 B2 * | 12/2010 | Morita ................. B62K 11/04 180/219 |
| 7,849,947 B2 * | 12/2010 | Morita ................. B62K 11/04 180/219 |
| 7,883,136 B2 * | 2/2011 | Tomolillo ................. B60J 1/04 296/180.5 |
| 7,963,358 B2 * | 6/2011 | Buell ................... B62J 35/00 180/225 |
| 2006/0290094 A1 | 12/2006 | Kamalian |
| 2008/0277181 A1 * | 11/2008 | Alsop ................... B62K 11/04 180/219 |
| 2010/0065363 A1 * | 3/2010 | Goodwin ............. B62K 25/583 180/227 |

FOREIGN PATENT DOCUMENTS

| EP | 1366975 A2 | 12/2003 |
| FR | 2905665 A1 | 3/2008 |

* cited by examiner

*Primary Examiner* — Kevin Hurley
*Assistant Examiner* — Michael Stabley
(74) *Attorney, Agent, or Firm* — Bachman & LaPointe, P.C.

(57) ABSTRACT

A motorcycle comprising a hollow self-supporting shell integrating the steering column, means for securing the engine and means for securing the suspension system, said shell having an inner space forming a petrol tank, said shell also including the driver's seat. Said shell has hollow spaces which are closed on either side of the median longitudinal vertical plane. The driver's seat is preferably formed by an extension of the hollow spaces.

11 Claims, 3 Drawing Sheets

Coupe AA

MOTORCYCLE COMPRISING A SELF SUPPORTING SHELL

BACKGROUND

The present invention relates to the field of motorcycles, and specifically to motorcycles comprising a self-supporting shell.

PRIOR ART

The prior art describes a shell structure used by the Marcel GUIGUET MGC 250 N3 BR motorcycle.

Said motorcycle has a shell frame formed by a rigid tank made of cast aluminium. Said tank has, at the front portion thereof, a built-in steering column, and at the rear portion thereof, a bump supporting the saddle. Said prior art motorcycle includes a second lower shell supporting the engine and the separate gearbox, as well as an element for coupling the front and rear brakes, the rear wheel axle and an oil tank. The two shells are connected by seven tie rods made of drop-forged steel, two forming a double front cradle, one at the centre, two behind the engine and two connected to the rear wheel axle.

The BUELL FIREBOLT XB9R motorcycle is also known, disclosing a double-beam frame structure comprising a steering column and a link with the swing arm as well as means for securing the engine. The two beams are hollow to be useful as petrol tanks. U.S. Pat. No. 6,484,837 and U.S. Pat. No. 7,690,467 describe a frame with double hollow side arms, containing petrol, connecting the swing arm centre to the steering column.

Also known is the KAWASKI KR500 motorcycle, which has a sheet-metal shell including a steering column and means for securing the engine and the swing arm. Said shell is useful as a petrol tank. A seat is welded to said shell.

Objective Problem of the Prior Art

The prior art solutions have a plurality of technical problems.

The solution proposed by MGC involves a very large number of added parts, in particular two shells and around ten tie rods, which leads not only to a high cost of manufacturing and assembly, but also to risk of failures.

Above all, said architecture is not suited to motorcycles with pendular rear suspension, since one of the frames extends until the rear wheel.

The other solutions also require the use of multiple parts.

In particular, the solutions proposed by US U.S. Pat. No. 6,484,837 and U.S. Pat. No. 7,690,467 show a frame element formed by two hollow arms, connecting the steering column to the swing arm centre. Said hollow frame requires additional parts such as the seat of the driver and the covering thereof, as well as a covering or upper body element containing the airbox.

Said assembly of additional parts results in higher assembly and maintenance costs and does not make it possible to optimise the volume of the tank.

SUMMARY

The subject matter of the present invention consists in solving the problems of the prior art with a highly integrated solution, using a very small number of structural parts while ensuring high rigidity and pleasing aesthetics.

For this purpose, the invention relates, according to the most general acceptance thereof, to a motorcycle comprising a hollow self-supporting shell integrating the steering column, means for securing the engine and means for securing the suspension system, said shell having an inner space forming a petrol tank, said shell also including the driver's seat. Said shell has hollow spaces which are closed on either side of the median longitudinal vertical plane. The driver's seat is preferably formed by an extension of the hollow spaces.

The two closed hollow spaces extend on either side of the median longitudinal vertical plane and the casings thereof define the side beams.

Said closed hollow spaces constitute the petrol tank and extend longitudinally over at least 85% of the length of said self-supporting shell.

Said hollow spaces extend in particular until the driver's seat.

Said shell preferably also has at least one transverse hollow space communicating with said longitudinal hollow spaces, said longitudinal hollow spaces being connected by a hollow space.

Said shell advantageously has two hollow side arms defining a recessed median area which is open on the bottom surface thereof.

According to one variant, said recessed median area is open on the top surface and on the bottom surface zone thereof such as to form an access to the engine.

According to a specific embodiment, said shell has a retractable means inserted in the top opening of said recessed median area.

According to another embodiment, the engine is supported by said self-supporting shell by two plates.

According to another variant, said plates also have a means for securing the swing arm supporting the rear wheel.

Advantageously, said plates have an arched shape, with at least two points for securing to said shell and at least two points for securing the engine, at least one of the points for attaching the plate to the shell being located in front of the engine crankshaft.

According to a first embodiment, said shell is made up of a block cast from a light alloy.

According to a second embodiment, said shell is made up of a carbon block.

According to a preferred variant, the motorcycle comprises two side linking plates each connecting said shell to the front swing arm centre, the shell having in the rear lower portion thereof a concave section freeing up the space to house the rear cylinder head of the engine.

The shell is preferably configured such that the plane passing through the bottom of said shell forms an angle of more than 20° relative to the transverse plane passing through the steering column and the swing arm centre.

Advantageously, the shell is configured such that the lower portion thereof does not surpass a horizontal transverse plane passing over the hinge pin of the swing arm and under the steering column.

BRIEF DESCRIPTION OF THE DRAWINGS

Further objectives and advantages of the invention will become apparent from the following description, made in reference to the appended drawings, wherein.

DETAILED DESCRIPTION

Figure 1:
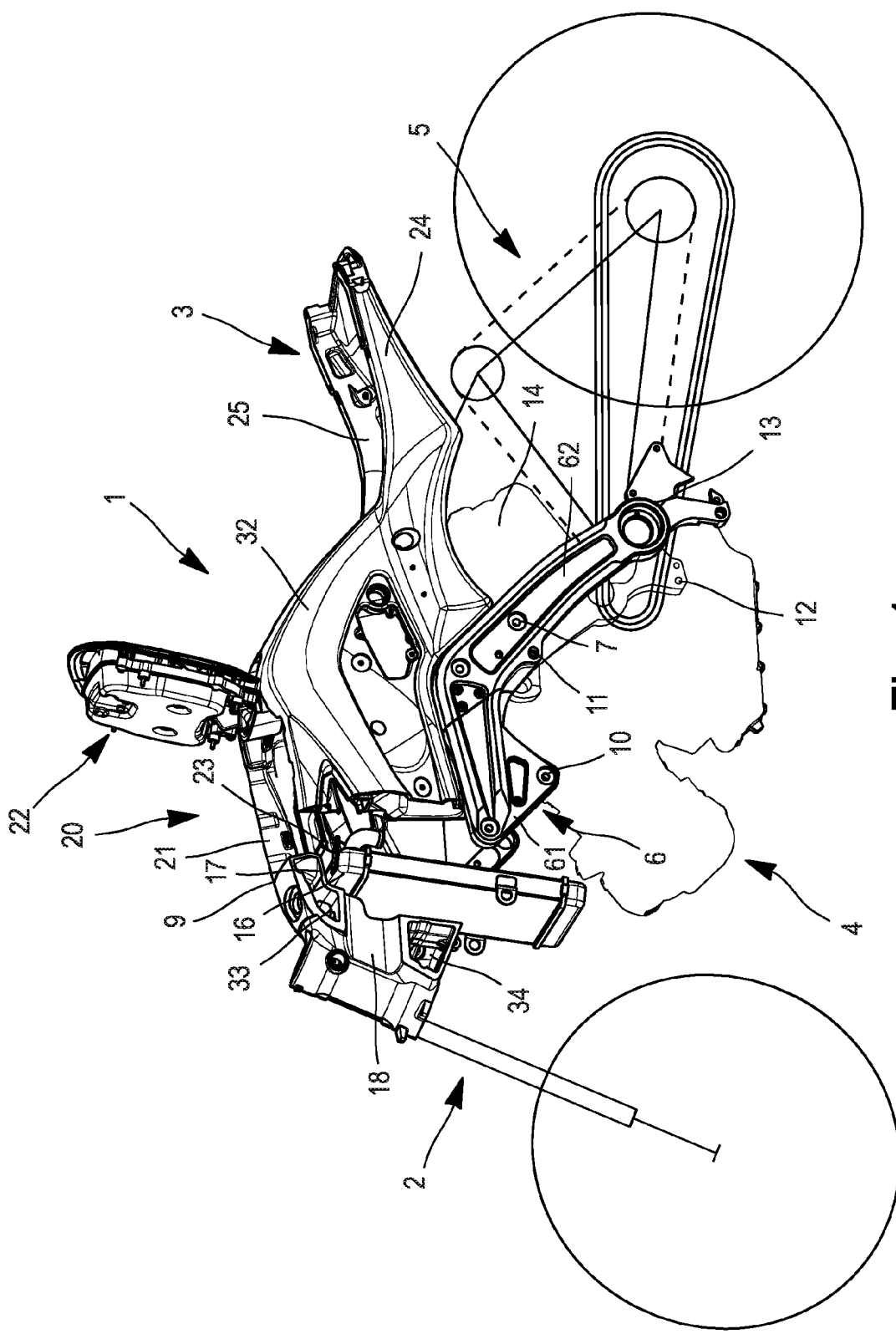
FIG. 1 is a view of a motorcycle according to the invention with a partial cut-out of the front left area of the shell.
Figure 2:
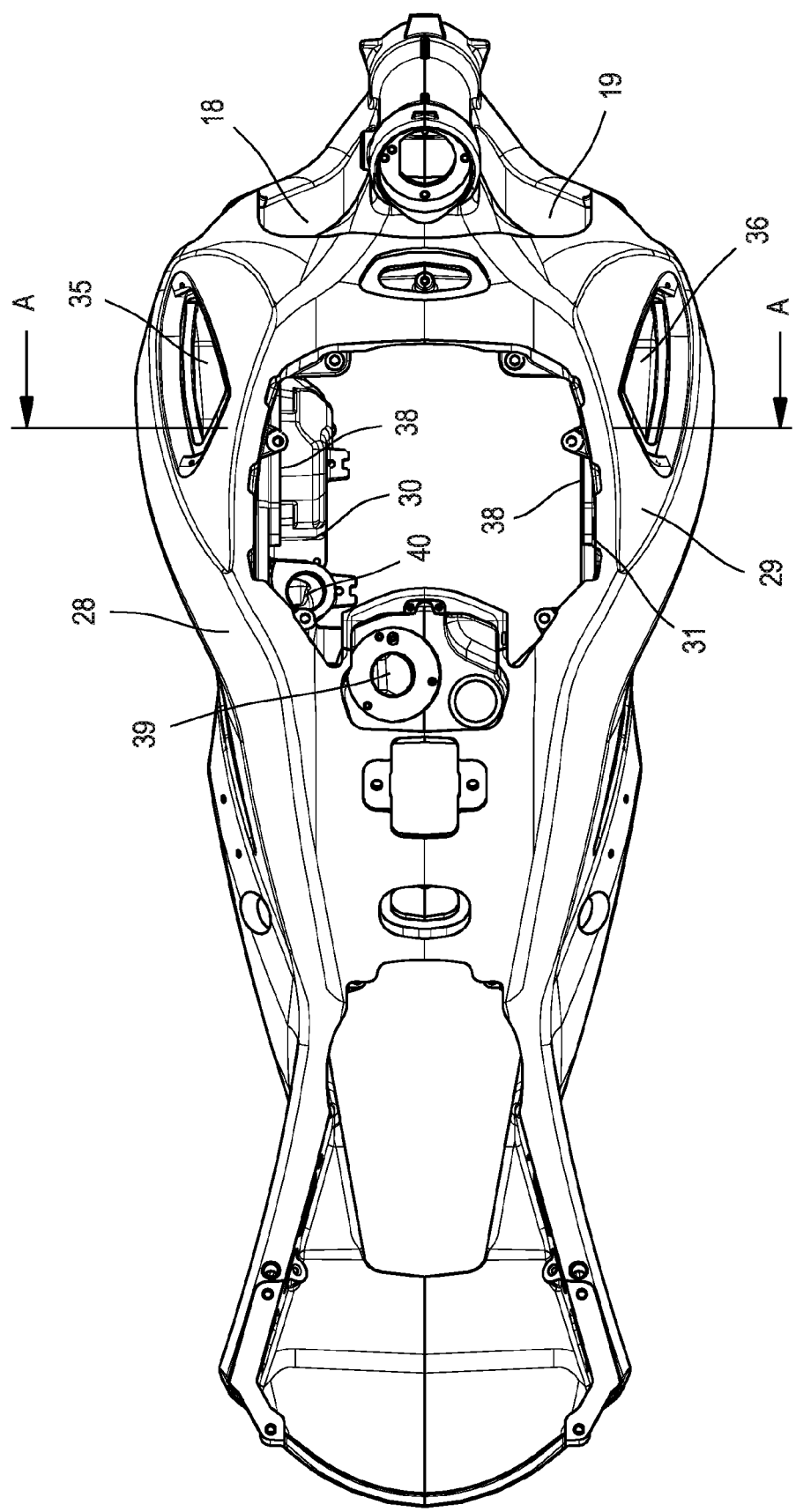
FIG. 2 is a detail view of the shell viewed from above.
Figure 3:
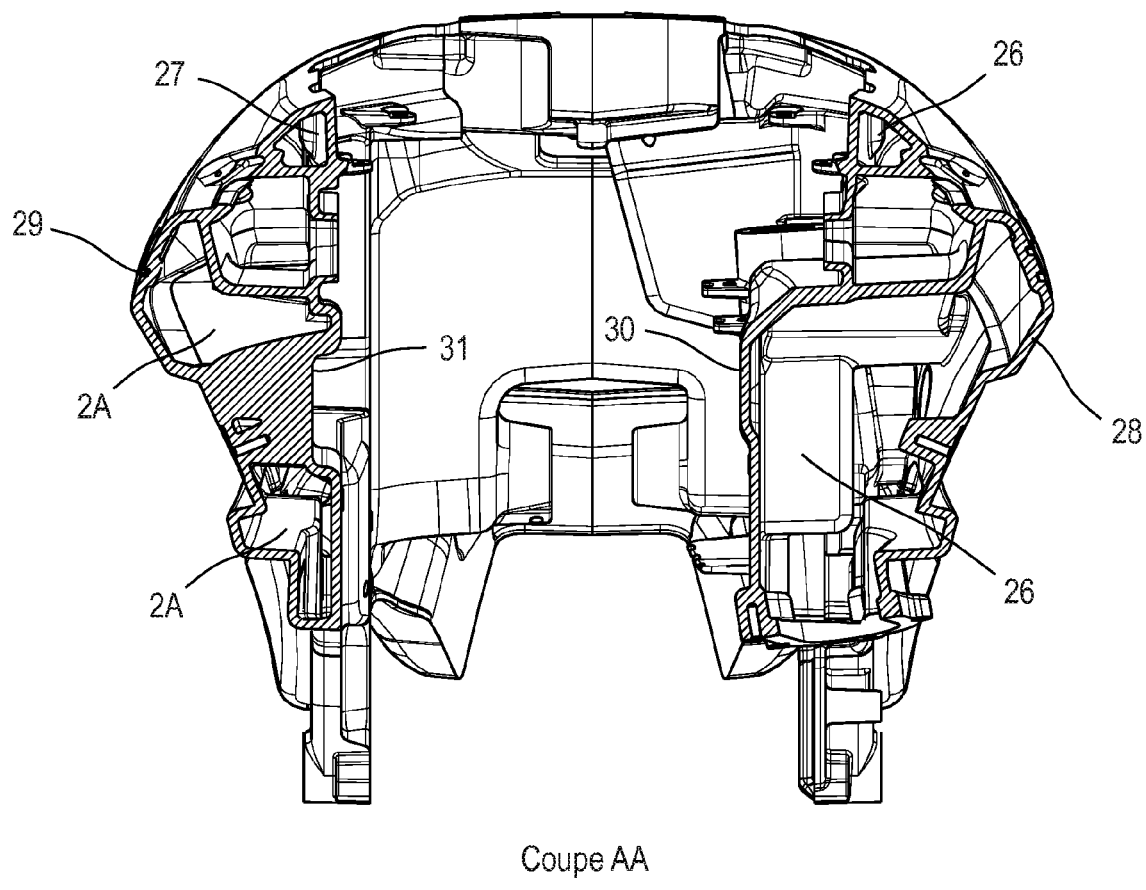
FIG. 3 is a detail view of the shell in a cross-section view according to a vertical cutaway plane AA.

FIG. 1 is a general view of a motorcycle according to the invention. The architecture is based on a self-supporting shell (1) providing the functions of frame and body. The motorcycle does not comprise any additional beam or frame providing a direct mechanical link between the steering column and the engine or swing arm. The shell (1) provides all the rigidity and geometric characteristics of the motorcycle. Likewise, the self-supporting shell directly forms the visible outer body (as does the regular tank of a motorcycle) and, where appropriate, receives outer covering elements such as knee grips.

Said shell (1) is a single, integral cast-metal part made by casting aluminium, aluminium or magnesium alloy or even carbon.

The shell (1) has a bump (2) at the front which constitutes the steering column. Said bump (2) has a tubular shape, receiving the steering tube bushes. Said bump (2) is built into the shell (1) and is not an added or welded part.

The general shape of the shell (1) is that of a motorcycle tank, extending longitudinally and being extended at the rear by an area (3) forming the driver's seat.

The bottom of the shell is defined by a substantially horizontal plane (64), extending above the swivel pin (63) of the swing arm. The plane (64) is defined by the plane passing through the lowest areas of the shell.

The engine (4) and the swing arm (5) are connected to one another as well as to the shell (1) by plates (6) which are attached to either side of the shell (1).

Each of the plates (6) is formed by a part made of aluminium alloy which is generally planar and hook-shaped. In the described example, said plates have three attachment holes (7, 8, 9) for linking with the shell (1). The plate (6) also has three attachment holes (10, 11 and 12) for securing the engine (4).

The plate also has a boss (13) for receiving the swing arm centre (5). The swing arm centre (5) forms a fourth point for attaching the engine.

The engine (4) in the described example is a two-cylinder engine tilted at an angle of around 25° relative to the horizontal axis. The shell (1) is configured such as to clear the space (14) which corresponds to the rear cylinder.

In the described example, the plate (6) is made up of two portions (61, 62) which are connected by screwing threadable fasteners. Said configuration makes it possible to simplify the assembly and support of the assembly, allowing the front portion (61) of the plate (6) to be removed for actions such as cleaning the filter of the petrol pump or replacing the petrol pump housed behind said portion of the plate (6).

The motorcycle includes a radiator (15) for cooling the engine. Said radiator (15) is arranged with the longest side thereof placed in the vertical direction. The top portion (16) is placed to the rear of the steering column (2). The shell has a recess (17) which enables the insertion of the top portion (16) of the radiator.

The front portion of the shell (1) additionally has two openings (18, 19) on either side of the steering column (2), for the air intake connecting to the main radiator (15)

The top portion (20) of the shell (1) has an opening (21) which can be blocked by a swinging gate (22). Said gate (22) additionally supports the dashboard instrumentation. Opening the gate provides access to the radiator cap (23), in order to fill the radiator (15). Said opening enables, in more general terms, access to the mechanical members of the engine (4).

The seat (3) is formed by two hollow extensions (24, 25) forming a U-shaped beam, intended for receiving a saddle.

The shell has two hollow spaces (26, 27) extending on either side of the median vertical plane, from the steering column (2) until the level of the seat (3). Said two hollow spaces are defined by the outer flanks (28, 29) of the shell and the inner walls (30, 31). Said hollow spaces (26, 27) are connected by a rear transverse hollow space (32) located in front of the seat (3) and by top and bottom front transverse hollow spaces (33, 34) at the rear of the steering column (2). Said hollow spaces (26, 27; 32, 33, 34) form the petrol tank.

The tank is filled with petrol via a filling opening (39) connected by a bump of the left longitudinal hollow space (26). Said hollow space (26) additionally comprises a housing (40) for receiving a petrol gauge.

The shell (1) also has lateral engine air intakes (35, 36) each leading into a transverse hollow inner space passing through the hollow spaces (26, 27), respectively, and leading into the inside of the shell (1) via air vents (37, 38).

The invention claimed is:

1. A motorcycle comprising:
a hollow self-supporting shell which integrates a steering column, means for securing an engine and means for securing a suspension system, said shell having an inner space forming a petrol tank, wherein said shell has two hollow side arms defining a recessed median area which is open on the bottom surface thereof, wherein said recessed median area is open on the top surface and on the bottom surface thereof such as to form an access to the engine, wherein said shell has a swinging gate inserted in the top opening of said recessed median area;
wherein said shell also integrates a driver's seat and has two closed hollow spaces extending on either side of a median longitudinal vertical plane;
a casing of said hollow spaces defining side beams, wherein the engine is supported by said self-supporting shell by two plates, wherein said plates also have a means for securing the swing arm supporting a rear wheel, said shell being a single, integral cast-metal part made by casting at least one of aluminium, aluminium alloy, magnesium alloy and carbon.

2. The motorcycle according to claim 1, wherein said plates have an arched shape, with at least two points for securing to said shell and at least two points for securing the engine, at least one of the points for attaching the plate to the shell being located in front of an engine crankshaft.

3. The motorcycle according to claim 1, wherein said closed hollow spaces constitute the petrol tank and extend longitudinally over at least 85% of the length of said self-supporting shell including said driver's seat.

4. The motorcycle according to claim 1, wherein said shell also has at least one transverse hollow space communicating with said longitudinal hollow spaces, which are connected by a hollow space.

5. The motorcycle according to claim 1, wherein said shell is made up of a block cast from a light alloy.

6. The motorcycle according to claim 1, wherein said shell is made up of a carbon block.

7. The motorcycle according to claim 1, further comprising two side linking plates each connecting said shell to a front swing arm centre, the shell having in a rear lower portion thereof a concave section freeing up space to house a rear cylinder head of the engine.

8. The motorcycle according to claim 1, wherein the shell is configured such that the plane passing through the bottom of said shell forms an angle of more than 20° relative to the transverse plane passing through the steering column and a swing arm centre.

9. The motorcycle according to claim 1, wherein the shell is configured such that a lower portion thereof does not surpass a horizontal transverse plane passing over a hinge pin of a swing arm and under a steering column.

10. The motorcycle according to claim 1, wherein the plate is made up of two portions which are connected by a threadable fastener.

11. A motorcycle comprising:
 a hollow self-supporting shell which integrates a steering column, means for securing an engine and means for securing a suspension system, said shell having an inner space forming a petrol tank, wherein said shell has two hollow side arms defining a recessed median area which is open on the bottom surface thereof, wherein said recessed median area is open on the top surface and on the bottom surface thereof such as to form an access to the engine, wherein said shell has a swinging gate inserted in the top opening of said recessed median area;
 wherein said shell also integrates a driver's seat and has two closed hollow spaces extending on either side of a median longitudinal vertical plane;
 a casing of said hollow spaces defining side beams, wherein the engine is supported by said self-supporting shell by two plates, wherein said plates also have a means for securing the swing arm supporting a rear wheel, wherein said plates have an arched shape, with at least two points for securing to said shell and at least two points for securing the engine, at least one of the points for attaching the plate to the shell being located in front of an engine crankshaft.

* * * * *